Feb. 27, 1962 R. B. SIMS 3,022,688
APPARATUS FOR CONTROLLING THICKNESS OF MATERIAL
Filed March 16, 1960
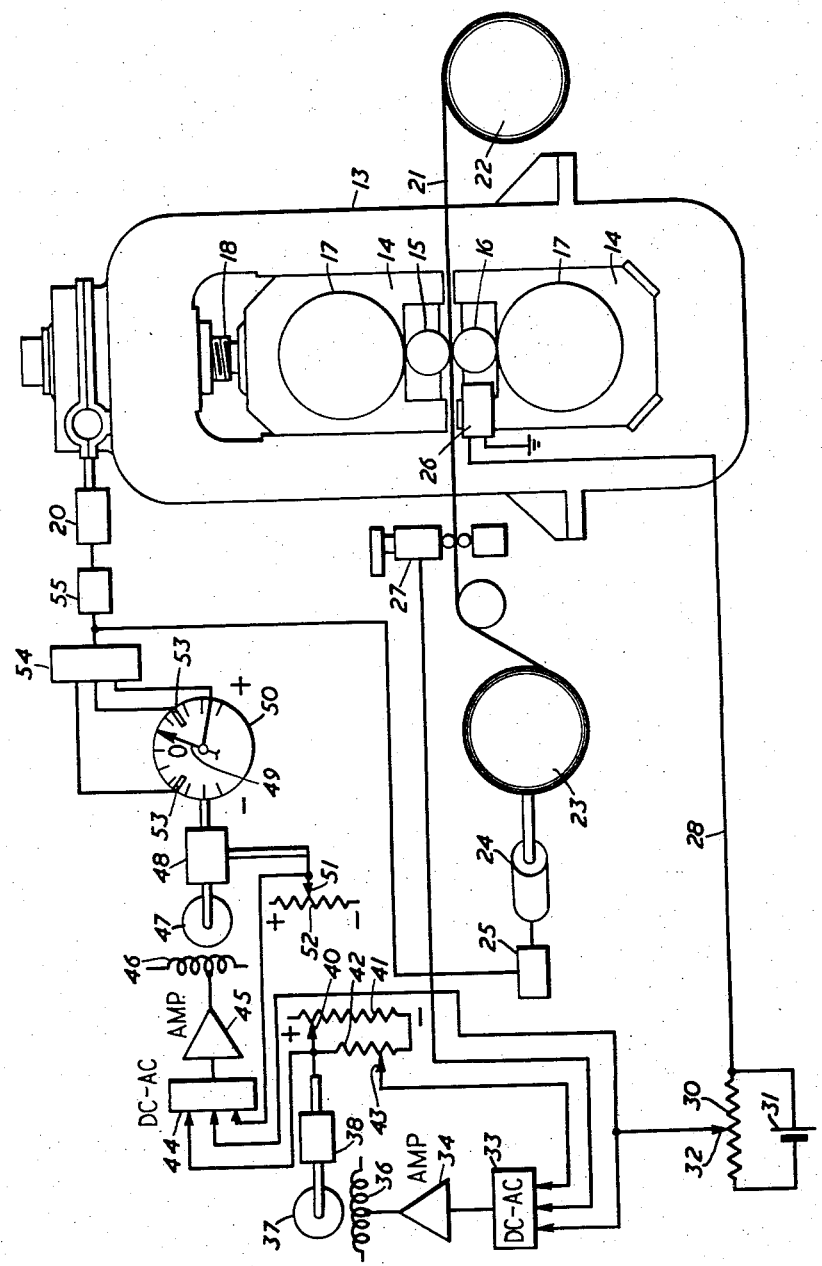
INVENTOR
RAYMOND BERNARD SIMS
BY J. E. Dickinson
ATTORNEY United States Patent Office 3,022,688
Patented Feb. 27, 1962

3,022,688
APPARATUS FOR CONTROLLING
THICKNESS OF MATERIAL
Raymond Bernard Sims, Sheffield, England, assignor to Davy and United Engineering Company Limited
Filed Mar. 16, 1960, Ser. No. 15,470
Claims priority, application Great Britain Mar. 24, 1959
11 Claims. (Cl. 80—56)

This invention relates to the control of the thickness of material and is particularly concerned with an automatic control system for controlling to a desired value the thickness of material issuing from a strip mill.

In the production of strip material, particularly in the rolling of metals, it is desirable to have continuous automatic control of the mill, whereby lengths of strip having a substantially constant desired thickness throughout are automatically obtained. In order to achieve this, a stable continuously acting servo-system may be employed to control the height of the roll gap or the tension applied to the strip issuing from the mill, or both, the servo-system being controlled by a signal representing the difference of the thickness of the material from the desired value.

For satisfactory operation of the servo-system, the measuring means for detecting the thickness of the issuing material should be as close to the roll gap as possible so that there is a minimum of delay between the occurrence and the detection of an error in the thickness. Secondly, the system should have stability over long periods of time. Thirdly, if the detector is located near to the roll gap, it should be as robust as possible, having regard to the conditions at the mill and should be reasonably cheap to make in view of the possibility of having to replace it, following damage by the leading end of the strip after a break, or by the trailing end of the strip.

It is already known to locate a measuring instrument having long-term stability characteristics and high accuracy at a considerable distance from the roll gap, but the substantial time lag induced by the distance between the occurrence of an error and its detection has precluded the possibility of basing a stable, accurate and continuously acting servo-system on such an instrument. A high accuracy measuring instrument of this type is delicate expensive and, if it were located close to the roll gap, it would be liable to damage. The risk of damage thus makes the use of the instrument in this way uneconomical.

In the present invention, there are provided two measuring means acting directly on the material. The first measuring means is located close to the mill gap and has a relatively short term stability; because of its short-term stability, it can be a relatively inexpensive device. The second measuring means is located at a safe distance from the mill and has a relatively long-term stability; the latter measuring means may therefore be relatively expensive, but, being disposed remotely from the mill, are not liable to damage. The thickness of the strip is controlled mainly by the first measuring means, so that there is little time lag between the occurrence and the detection of an error in the thickness of the material issuing from the strip, but its operation is monitored by the second measuring means so that errors, resulting from the short-term stability of the first measuring means, may be compensated.

Thus, in accordance with a first aspect of the present invention, an automatic control system for controlling to a desired value the thickness of material issuing from a mill comprises first measuring means and second measuring means, each for directly measuring independently the thickness of the material issuing from the mill, the first measuring means being situated at a point close to the mill gap and having a relatively short-term stability and the second measuring means being situated more remotely from the mill and having a relatively long-term stability, and means controlled jointly by the first and second measuring means for controlling the thickness of the material issuing from the mill to keep that thickness substantially at the desired value.

In a preferred form of the invention, the automatic control system comprises first measuring means and second measuring means, each acting directly on the strip and producing independently electrical signals in accordance with the departure, from the desired value, of the thickness of the material issuing from the mill, the first measuring means being effective on the material at a point close to the mill gap and having a relatively short-term stability and the second measuring means being effective on the material more remotely from the mill and having a relatively long-term stability, a first circuit which has a relatively long time constant and to which the signals from the first and second measuring means are applied in opposition and which produces an error signal dependent on the averaged difference between those signals, a second circuit which has a relatively short time constant and in which the error signal is opposed to the signal from the first measuring means to produce a control signal, and means operated by the control signal for controlling the thickness of the strip issuing from the mill so that the thickness is held substantially at the desired value. Thus, if the short-term stability of the first measuring means should give rise to errors in the departure signals given by the first measuring means, those signals are modified by the error signal from the integrating circuit, so that the strip thickness is always held substantially at the desired value, regardless of inaccuracies of the first measuring means.

The invention will be more readily understood by way of example from the following description of a control circuit for a strip mill, reference being made to the accompanying drawing which is a schematic illustration of the mill and the control circuit.

Referring to the drawing, the mill comprises a frame 13, in which are mounted in chocks 14 work rolls 15, 16 and back-up rolls 17. The gap between the work rolls 15, 16 may be adjusted by a screw 18 bearing on the top of the upper chock 14 and driven by an electric screw-down motor 20. The strip 21 to be rolled is drawn off a pay-off reel 22, passes between the work rolls 15, 16 and is reeled on to the take-up reel 23. The take-up reel 23 is driven by a reeling motor 24, the speed of which is controlled by a speed control circuit 25.

As shown in the drawing, the mill is supplied with two measuring instruments for strip thickness. The first measuring instrument 26 is located close to the work rolls 15, 16 at the output side of the mill. This instrument 26 should be located as near to the roll gap as possible and is shown as mounted on the frame. Because it is liable to damage, instrument 26 should be robust and relatively cheap, although it should have a high accuracy over short periods of say 5 mins. or so. In other words, the measuring instrument 26 has short-term stability, by which is meant that the characteristics of the instrument do not remain stable for hours on end. Preferably the instrument is of the radiation-type, such as a gamma gauge; instruments of this type are commercially available.

The second measuring instrument 27, on the other hand, is not so robust as instrument 26 and may be a relatively expensive device. Furthermore, it must be readily accessible to the mill operator so that the latter may check its absolute accuracy. For these reasons instrument 27 is located, as shown, some distance from the mill gap where it is accessible and is less liable to damage. Instrument 27 should have high accuracy and long-term stability, by which is meant that the characteristics of the instrument do not vary appreciably over the long periods of time encountered in rolling strip, i.e. of the order of hours. Instrument 27 is illustrated as being a contact-type micrometer comprising a pair of rollers or pads urged against opposite faces of the strip 21. Contact-type micrometers are also commercially available and in that form can be set to the desired value when a signal is emitted proportional to the departure of the strip thickness from that desired value.

Reverting to the measuring instrument 26, the signal produced by it on a line 28 is dependent on the detected thickness of the strip. The signal is applied to a potentiometer 30 connected across a D.C. source represented by the battery 31. The sliding contact 32 of the potentiometer can be set by hand to the desired strip thickness, with the result that the voltage appearing on sliding contact 32 is equal to the departure of the strip thickness, as detected by instrument 26, from the desired value.

Sliding contact 32 is connected to the input of a D.C.-A.C. converter 33, in opposition to the signal from the measuring instrument 27 which, as already explained, gives a signal dependent on the departure of the strip thickness as measured by that instrument 27 from the desired value. Potentiometer 30 and the measuring instrument 27 are set up to the same desired value of thickness and may be ganged together for this purpose.

The output from converter 33 is applied to an amplifier 34, the output from which feeds the winding 36 of a servo motor 37. The rotor of servo motor 37 is connected through a gear box 38 having a large step down ratio to the sliding contact 40 of a potentiometer 41 which is connected across a supply of D.C. voltage. The sliding contact 40 is also connected through a potentiometer 42 to one end of potentiometer 41 and a sliding contact 43 on potentiometer 42 is connected to the input of converter 33 in opposition to the signals from instrument 27 and potentiometer 30. As a result, the contact 40 of potentiometer 41 is moved to a position at which the voltage on that contact 40 is directly proportional to the difference between the voltages from measuring instrument 27 and potentiometer 30, i.e. the difference between the two departure signals produced by the instruments 26, 27. Because of the large step down ratio of gear box 38 and the sluggishness of the feed back loop provided by the potentiometer 42 connected to the input of converter 33, the servo-system formed by the elements 44–48 has a long time constant and the error voltage appearing on contact 40 represents the difference between the thickness departure signals supplied by the instruments 26, 27 integrated over the time period of the system. The servo-system does not therefore respond to transient changes in the signal supplied by either measuring instrument and the error voltage represents only long-term divergencies between the two thickness-departure signals.

The voltage on the contact 32 of potentiometer 30 and the voltage on contact 40 of potentiometer 41 are applied in opposition to the input of a second D.C.-A.C. converter 44. The output of converter 44 is applied to a high gain amplifier 45, the output of which is in turn applied to feed the winding 46 of a servo motor 47. The rotor of motor 47 is coupled through a gear box 48 to the pointer 49 of an indicator 50. Gear box 48 is also connected to the sliding contact 51 of a potentiometer 52 connected across a D.C. source. The voltage appearing on contact 51 is applied to the input of converter 44 in opposition to the other signals. As a result, the pointer 49 of indicator 50 is moved through an angular position accurately equal to the difference between the voltages on contacts 32, 40. The characteristics of the servo-system comprising the elements 44–48 and the feed-back loop from potentiometer 52 are specially arranged to have a considerably faster response time than that of the similar servo-system constituted by elements 33–43, the latter system having a response time 10 to 20 times greater than that of the former.

Indicator 50 is of the centre-zero type and a pair of contacts 53 are located at equal distances on each side of the zero position of the pointer. One or other of contacts 53 is thus engaged by the pointer 49 if the latter moves through a fixed distance in either direction from the zero position. Pointer 49 and contacts 53 are connected to a control circuit 54 controlling contactors 55 for screw-down motor 20. At the same time, the control circuit 54 controls the speed control circuit 25 for the reeling motor 24.

In operation, while the measuring instrument 26 gives accurate indications of the strip thickness, the voltage of sliding contact 40 is zero and the pointer 49 is controlled entirely by the thickness departure signal appearing on moving contact 32. As already explained, pointer 49 is moved to take up a position from the zero position equal to the voltage on moving contact 32 and therefore to the departure of the thickness from the desired thickness, as measured by instrument 26. If the departure exceeds a predetermined amount in either direction, as represented by the angular distance between the contacts 52 and the zero position of indicator 50, a circuit is closed between pointer 49 and one of the contacts 53 to operate the control circuit 54 and to alter the thickness of the strip, by operation of the screw-down motor 20 in one direction or the other, according to the sense of the departure of the thickness from the desired value. The roll gap is thus altered to change the strip thickness towards the desired value. When the thickness has been restored sufficiently for the pointer 49 to be brought out of contact with the contact 53, further operation of motor 20 is stopped.

If, on the other hand, the measuring instrument 26 gives erroneous readings, there will be a difference between the thickness departure—representing voltages supplied by contact 32 and the measuring instrument 27. Motor 37 is operated until the voltage on contact 41 is equal to the difference between the departure signals given by the measuring instruments 26, 27 and the moving pointer 49 of indicator 50 is controlled by the difference between the thickness-departure voltage on moving contact 32 and the error signal on contact 40. As a result, indicator 50 indicates the true departure of the strip thickness from the desired value, rather than the departure as represented by the measuring instrument 26 and the potentiometer 30, and the screw-down motor is controlled to maintain the true departure of the strip thickness from the desired value within the limits determined by the contacts 53.

The control circuit 54 is illustrated as controlling the reeling motor 24, as well as the screw-down motor 20. In fact, control circuit 54 may control either one of the two motors 20, 24, the thickness of the strip being capable of control by adjusting the roll gap between work rolls 15, 16 or by the tension in the strip 21. When control circuit 54 controls the reeling motor 24 and the strip thickness departs from the desired value, the speed of motor 24 is adjusted to alter the strip tension in known manner until the departure of the strip thickness from the desired value is returned to within the limits set by contacts 53. Alternatively, control circuit 54 may control both motors 20, 24 simultaneously as shown; in this case, the thickness of the strip is initially adjusted by altering the tension in the strip 21, because the tension control is quicker acting than the screw-down control and the strip thickness is restored by tension adjustment before the screw-down motor 20 can operate. If the adjustment in the tension of the strip exceeds allowable limits, then further adjustment of tension is prohibited and the screw-down control becomes effective to compensate for larger departures of the strip thickness from the desired value.

In accordance with the provisions of the patent statutes, I have explained the principle and operation of my invention and have illustrated and described what I consider to represent the best embodiment thereof. However, I desire to have it understood that within the scope of the appended claims, the invention may be practiced otherwise than as specifically illustrated and described.

I claim:

1. An automatic control system for controlling to a desired value the thickness of material issuing from a mill, comprising first measuring means and second measuring means, each for directly measuring independently the thickness of the material issuing from the mill, the first measuring means being situated at a point close to the mill gap and having a relatively short-term stability and the second measuring means being situated more remotely from the mill and having a relatively long-term stability, and means controlled jointly by the first and second measuring means for controlling the thickness of the material issuing from the mill to keep that thickness substantially at the desired value.

2. An automatic control system for controlling to a desired value the thickness of material issuing from a mill, comprising first measuring means and second measuring means, each for giving independently a signal in accordance with the departure of the issuing thickness from the desired value, the first measuring means having a relatively short-term sgtability and being effective on the material at a point close to the mill gap where there is lack of access over long periods, and the second measuring means having a relatively long-term stability and being effective on the material at a point more remote from the mill gap where access may be had to the measuring means, means operated by the signal from the first measuring means for controlling the thickness of the material issuing from the mill so that that thickness is held substantially at the desired value, and means for modifying the signal from the first measuring means by the signal from the second measuring means, in order to compensate for errors of the first measuring means.

3. An automatic control system for controlling to a desired value the thickness of material issuing from a mill, comprising first measuring means and second measuring means, each for giving independently a signal in accordance with the departure of the issuing thickness from the desired value, the first measuring means having a relatively short-term stability and being effective on the material at a point close to the mill gap, and the second measuring means having a relatively long-term stability and being effective on the material at a point more remote from the mill gap, means for comparing the signals from the first and second measuring means and for giving an error signal dependent on the deviation of the thickness departure as measured by the first measuring means from the thickness departure as measured by the second measuring means, means for modifying the signal from the first measuring means by the error signal, and means operated by the modified signal from the first measuring means for controlling the thickness of the strip issuing from the mill so that the thickness is held substantially at the desired value.

4. An automatic control circuit according to claim 3 in which the comparing means includes an integrator which produces an error signal representing the integral with time of the difference between the signals from the first and second measuring means.

5. An automatic control system for controlling the thickness of material issuing from a mill to a desired value, comprising first measuring means and second measuring means, each acting directly on the strip and producing independently electrical signals in accordance with the departure, from the desired value, of the thickness of the material issuing from the mill, the first measuring means being effective on the material at a point close to the mill gap and having a relatively short-term stability and the second measuring means being effective on the material more remotely from the mill and having a relatively long-term stability, a first circuit which has a relatively long time-constant to which the signals from the first and second measuring means are applied in opposition and which produces an error signal dependent on the integral over the time period of the circuit of the difference between those signals, a second circuit which has a relatively short time constant and in which the error signal is opposed to the signal from the first measuring means to produce a control signal, and means operated by the control signal for controlling the thickness of the strip issuing from the mill so that the thickness is held substantially at the desired value.

6. An automatic control system according to claim 5 in which the means for controlling the strip thickness comprise a motor for adjusting the mill gap and a control circuit controlling that motor and controlled by the control signal.

7. An automatic control system according to claim 5 in which the means for controlling the strip thickness comprise or include a circuit controlled by the control signal and controlling the tension in the material issuing from the mill.

8. An automatic control system according to claim 5 in which the second measuring means is a contact-type micrometer situated at a distance from the mill gap and giving a signal in accordance with the departure from the thickness of the material.

9. An automatic control system according to claim 5 in which the first measuring means is a radiation-type thickness gauge situated at a point close to the mill gap and means for biasing the signal therefrom by a signal representing the desired value of thickness.

10. An automatic control system according to claim 5 in which the first circuit comprises a potentiometer, the sliding contact member of which is driven to a position dependent on the difference between the signals from the first and second measuring means.

11. An automatic control system according to claim 10 in which the sliding contact member is driven by a motor energised by the output of an amplifier, to the input of which are applied in opposition the signals from the first and second measuring means and a signal dependent on the position of the contact member.

No references cited.

UNITED STATES PATENT OFFICE
CERTIFICATE OF CORRECTION

Patent No. 3,022,688 February 27, 1962

Raymond Bernard Sims

It is hereby certified that error appears in the above numbered patent requiring correction and that the said Letters Patent should read as corrected below.

Column 6, line 41, for "from" read -- of --.

Signed and sealed this 31st day of July 1962.

(SEAL)
Attest:

ERNEST W. SWIDER
Attesting Officer

DAVID L. LADD
Commissioner of Patents